(12) United States Patent
Boiocchi et al.

(10) Patent No.: US 7,096,908 B2
(45) Date of Patent: Aug. 29, 2006

(54) SELF-SUPPORTING TYRE FOR A VEHICLE WHEEL, AND METHOD OF MAKING THE TYRE (75) Inventors: Maurizio Boiocchi, Segrate (IT); Renato Caretta, Gallarate (IT); Stefano Gaiazzi, Quinzano di Sumirago (IT)

(73) Assignee: Pirelli Pneumatici S.p.A., Milan (IT)

( * ) Notice: Subject to any disclaimer, the term of this patent is extended or adjusted under 35 U.S.C. 154(b) by 33 days.

(21) Appl. No.: 10/491,102

(22) PCT Filed: Sep. 28, 2001

(86) PCT No.: PCT/IT01/00500

§ 371 (c)(1),
(2), (4) Date: Oct. 1, 2004

(87) PCT Pub. No.: WO03/029033

PCT Pub. Date: Apr. 10, 2003

(65) Prior Publication Data

US 2005/0034800 A1 Feb. 17, 2005

(51) Int. Cl.
*B60C 17/00* (2006.01)
*B60C 15/00* (2006.01)
*B60C 15/06* (2006.01)
*B29D 30/38* (2006.01)
*B29D 30/42* (2006.01)

(52) U.S. Cl. .................. 152/517; 152/539; 152/543; 152/548; 152/550; 152/558; 152/560; 156/133

(58) Field of Classification Search ............ 152/517, 152/539, 543, 548, 550, 558, 560; 156/133
See application file for complete search history.

(56) References Cited

U.S. PATENT DOCUMENTS

| 3,954,131 | A | 5/1976 | Hoshino et al. |
| 5,871,602 | A | 2/1999 | Paonessa et al. |
| 6,814,119 | B1 * | 11/2004 | Caretta et al. ............ 152/517 |
| 2003/0150538 | A1 * | 8/2003 | Ceretta .................. 152/550 X |
| 2004/0074580 | A1 * | 4/2004 | Caretta ...................... 152/517 |

FOREIGN PATENT DOCUMENTS

| EP | 0 385 192 A1 | 9/1990 |
| EP | 0 475 258 A1 | 3/1992 |
| EP | 0 542 252 A1 | 5/1993 |
| EP | 0 919 406 A1 | 6/1999 |
| EP | 0 928 680 A1 | 7/1999 |
| EP | 0 928 702 A1 | 7/1999 |

(Continued)

*Primary Examiner*—Adrienne C. Johnstone
(74) *Attorney, Agent, or Firm*—Finnegan, Henderson, Farabow, Garrett & Dunner, L.L.P.

(57) ABSTRACT

A self-supporting tyre for a vehicle wheel includes a carcass structure, a belt structure, a tread band, a pair of sidewalls, and at least one elastic stiffening insert. The carcass structure includes at least one carcass ply provided with end flaps engaged with respective annular reinforcing structures. The annular reinforcing structures are disposed in coaxial relationship with a geometric rotation axis of the tyre at positions axially spaced apart from each other. Each annular reinforcing structure includes at least one first circumferentially inextensible annular anchoring insert. The at least one elastic stiffening insert is incorporated into the carcass structure, at least at one of the sidewalls, and includes a radially internal end portion at least partly disposed in axial side-by-side relationship against the at least one first annular anchoring insert. A method of making the tyre is also disclosed.

28 Claims, 6 Drawing Sheets

FOREIGN PATENT DOCUMENTS

| | | |
|---|---|---|
| GB | 2 053 815 A | 2/1981 |
| GB | 2 087 805 A | 6/1982 |
| WO | WO 98/56604 | 12/1998 |
| WO | WO 00/26014 | 5/2000 |
| WO | WO 00/35666 | 6/2000 |
| WO | WO 01/36185 A1 | 5/2001 |
| WO | WO 01/54926 A1 | 8/2001 |
| WO | WO 01/54927 A2 | 8/2001 |

* cited by examiner

SELF-SUPPORTING TYRE FOR A VEHICLE WHEEL, AND METHOD OF MAKING THE TYRE

CROSS-REFERENCE TO RELATED APPLICATIONS

This application is a national-phase entry under 35 U.S.C. 0371 from International Application No. PCT/IT01/00500, filed Sep. 28, 2001, in the Italian Patent Office, the contents of which are relied upon and incorporated herein by reference.

BACKGROUND OF THE INVENTION

1. Field of the Invention

The present invention relates to a self-supporting tyre for vehicle wheels, comprising: a carcass structure having at least one carcass ply with end flaps in engagement with respective annular reinforcing structures which are disposed in coaxial relationship with a geometric rotation axis of the tyre at positions axially spaced apart from each other and each comprising at least one first circumferentially-inextensible annular anchoring insert; a belt structure applied to the carcass structure at a radially external position thereof; a tread band applied to the belt structure at a radially external position of same; at least one pair of sidewalls applied at laterally opposite positions to the carcass structure; at least one elastic stiffening insert incorporated into the carcass structure at least at one of said sidewalls.

The present invention also relates to a method of manufacturing a self-supporting tyre for vehicle wheels, comprising the steps of: preparing a carcass structure having at least one carcass ply provided with end flaps in engagement with respective annular reinforcing structures disposed in coaxial relationship with a geometric rotation axis of the tyre at positions axially spaced apart from each other and each comprising at least one first circumferentially-inextensible annular anchoring insert; applying a belt structure to the carcass structure at a radially external position thereof; applying a tread band to the belt structure at a radially external position of same; applying a pair of sidewalls at laterally opposite positions to the carcass structure; incorporating at least one elastic stiffening insert into the carcass structure, at least at one of said sidewalls.

2. Description of the Related Art

Tyres for vehicle wheels essentially comprise a carcass structure made up of one or more carcass plies that, in the most classic solutions, have the respective inner circumferential edges turned up around inextensible annular inserts being part of annular reinforcing structures and placed at axially opposite positions in the regions usually identified as tyre "beads".

Applied to the carcass ply or plies, at a radially external position, is a belt structure comprising one or more belt layers radially superposed in succession. A tread band of elastomer material is radially superposed on the belt structure. The outer sides of the carcass structure are also covered with respective sidewalls made of elastomer material as well.

It is to be pointed out that, to the aims of the present invention, by the term "elastomer material" it is intended a rubber blend in its entirety, that is the assembly made up of at least one base polymer suitably amalgamated with reinforcing fillers and/or process additives of various types.

To give the tyre self-support qualities, i.e. the capacity to ensure ride over short-medium distances in the absence of inflation pressure, due to a puncture for example, one or more stiffening inserts of elastomer material are known to be integrated into the carcass structure, close to the tyre sidewalls; said inserts are usually referred to as "lunettes" and they conveniently support the vehicle load when the usual inflating pressure of the tyre is lacking.

In this connection different manufacturing solutions have been proposed, aiming at giving the tyre the required self-support features, without impairing ride comfort when the tyre is inflated. These solutions are essentially diversified as regards both the physico-chemical features of the elastomers employed in making the elastic stiffening inserts, and the number of the inserts to be provided, as well as in terms of positioning of said inserts relative to the carcass ply or plies.

Examples of these solutions that however do not ensure satisfactory results, are known from documents EP 0385192, U.S. Pat. No. 3,954,131 and GB 2053815 showing self-supporting structures comprising one lunette alone placed at each sidewall and disposed internally of the carcass ply or plies.

Good results, particularly as regards the tyre self-supporting capacity under deflated conditions, are achieved by adopting manufacturing solutions in which at least one of the elastic stiffening inserts which are present at each sidewall, is enclosed between two carcass plies forming a sort of closed container around it, as disclosed in documents GB 2087805, EP 475258 and EP 542252, for example.

The Applicant has however perceived that placing the elastic stiffening inserts in a sort of closed container defined by the carcass plies turned up around the annular anchoring structures tends to increase stiffness of the tyre sidewall too much, not only with reference to its vertical flexibility, i.e. in connection with substantially radial stresses with respect to the rotation axis of the tyre, but also with reference to its torsional responsiveness, i.e. in connection with stresses directed tangentially of the circumferential extension of the tyre itself.

By adopting particular expedients, as described in documents EP 475258 and EP 542252 in the name of the same Applicant for example, the possibility of restricting within limits, the vertical stiffness of the sidewall under running conditions with an inflated tyre are achieved. On the other hand, these technical solutions tend to make the tyre structure more complicated and heavier and are not efficient for the purpose of limiting the torsional stiffness which, as found out by the Applicant, is one of the decisive factors in terms of ride comfort, particularly at medium/high speeds. In fact, the tyre capacity of absorbing impacts transmitted by potholes or other unevennesses present in a road surface depends on the torsional stiffness of the tyre.

In accordance with the present invention it has been found that in the field of self-supporting-tyre manufacture, unexpected advantages can be reached if the elastic stiffening inserts have flaps axially overlapping the inextensible annular inserts, to ensure better anchoring of the reinforcing element to the annular structures and, through it, to the mounting rim during use at zero pressure.

In particular, it is an object of the present invention to provide a novel self-supporting tyre characterized in that said elastic stiffening insert has a radially-internal end portion disposed at least partly in axial side by side relationship against said first annular anchoring insert.

It is a further object of the invention to provide a method of manufacturing a self-supporting tyre for vehicle wheels, characterized by the fact of disposing said at least one first annular anchoring insert at a position in side by side relationship against a radially-internal end portion of the elastic stiffening insert.

BRIEF DESCRIPTION OF THE DRAWINGS

Further features and advantages will become more apparent from the detailed description of a preferred but not exclusive embodiment of a method of manufacturing a self-supporting tyre for vehicle wheels, and a self-supporting tyre obtainable by said method, in accordance with the present invention. This description will be set forth hereinafter with reference to the accompanying drawings given by way of non-limiting example in which.

DETAILED DESCRIPTION OF THE EXEMPLARY EMBODIMENTS

With reference to the drawings, a tyre for vehicle wheels provided with a carcass structure 2 and made following the method of the present invention has been generally identified by reference numeral 1.

In the embodiment shown in the drawings, the carcass structure 2 has a first and a second carcass plies 3a, 3b having a substantially toroidal conformation and in engagement, through their opposite end flaps, with a pair of annular reinforcing structures 4 (only one of which is shown in the drawings) disposed in coaxial relationship with a geometric rotation axis of the tyre at positions axially spaced apart from each other; each of the annular reinforcing structures 4, when the tyre is completed, is placed at the region usually identified as "bead" and comprises at least one annular anchoring insert 5a, 5b, 5c, to ensure anchoring of the tyre 1 to a corresponding mounting rim.

Applied to the carcass structure 2, at a radially external position, is a belt structure 6 comprising one or more belt strips 7a, 7b and 8. Circumferentially superposed on the belt structure 6 is a tread band 9 in which, following a moulding operation carried out concurrently with the tyre vulcanization, longitudinal and transverse grooves 9a are formed which are conveniently disposed to define a desired "tread pattern".

Tyre 1 also comprises a pair of so-called "sidewalls" 10, laterally applied to the carcass structure 2 on opposite sides thereof and further incorporates at least one elastic stiffening insert 11, at least at one of said sidewalls 10.

The carcass structure 2 can be possibly coated with a so-called "liner" 12, essentially consisting of at least one air-tight layer 12a of elastomer material adapted to ensure a hermetic seal of the tyre when inflated.

Figure 1:
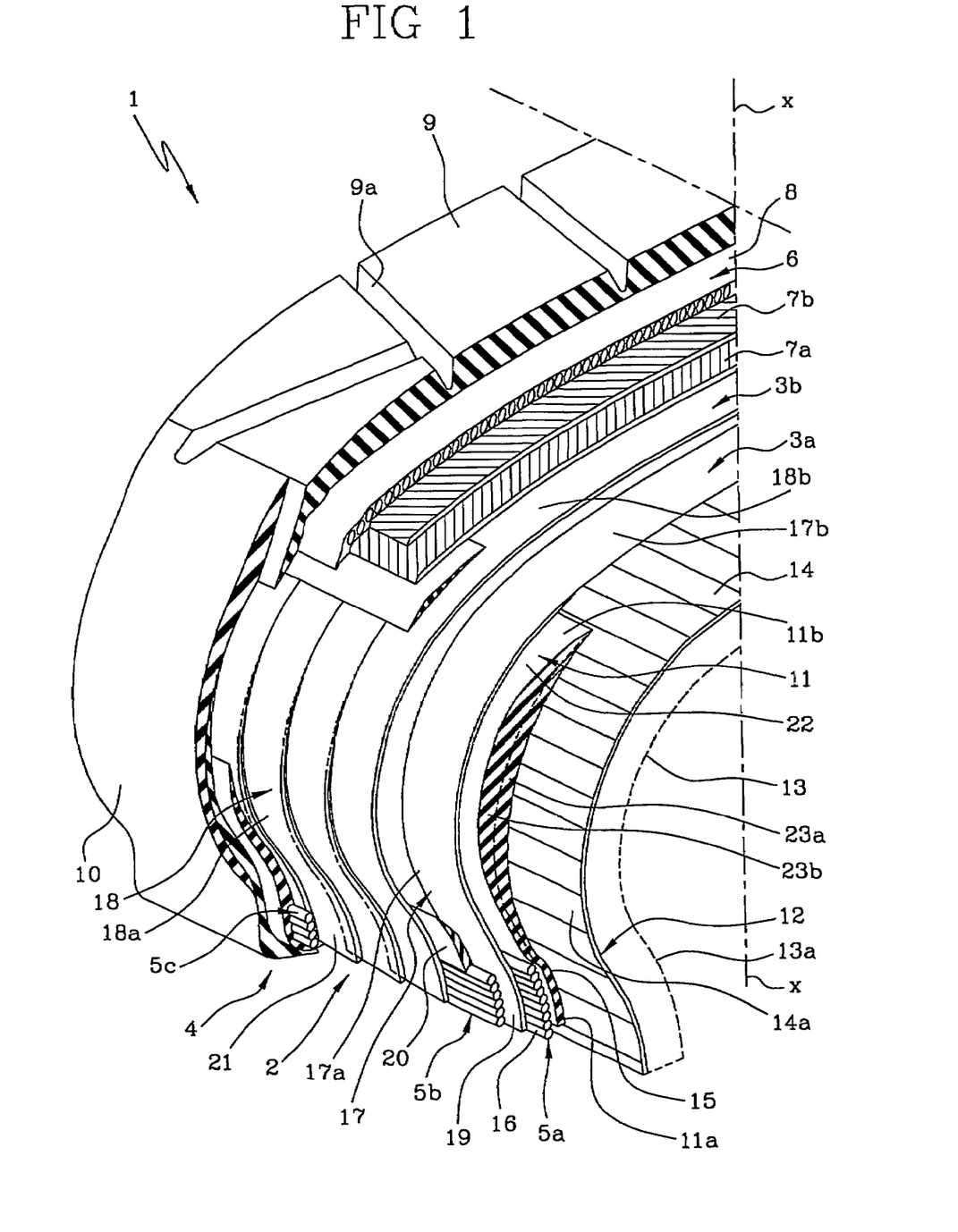
FIG. 1 is a fragmentary and cut-away perspective view of a tyre built in accordance with the present invention, associated with a toroidal support.
Figure 2:
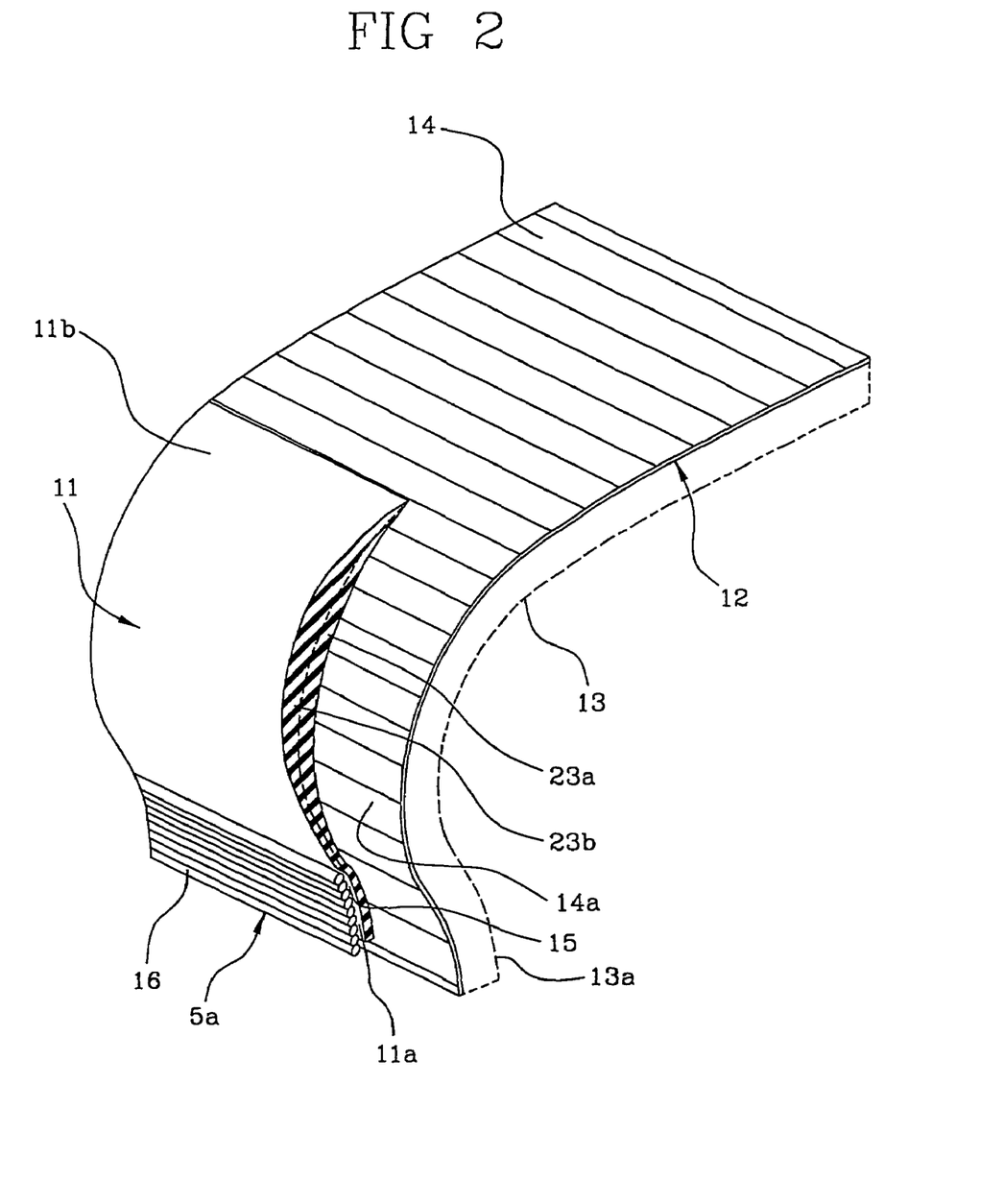
FIG. 2 is a fragmentary perspective view of the application of an elastic stiffening insert and a first annular anchoring insert being part of an annular reinforcing structure, onto one of the sides of the toroidal support.
Figure 3:
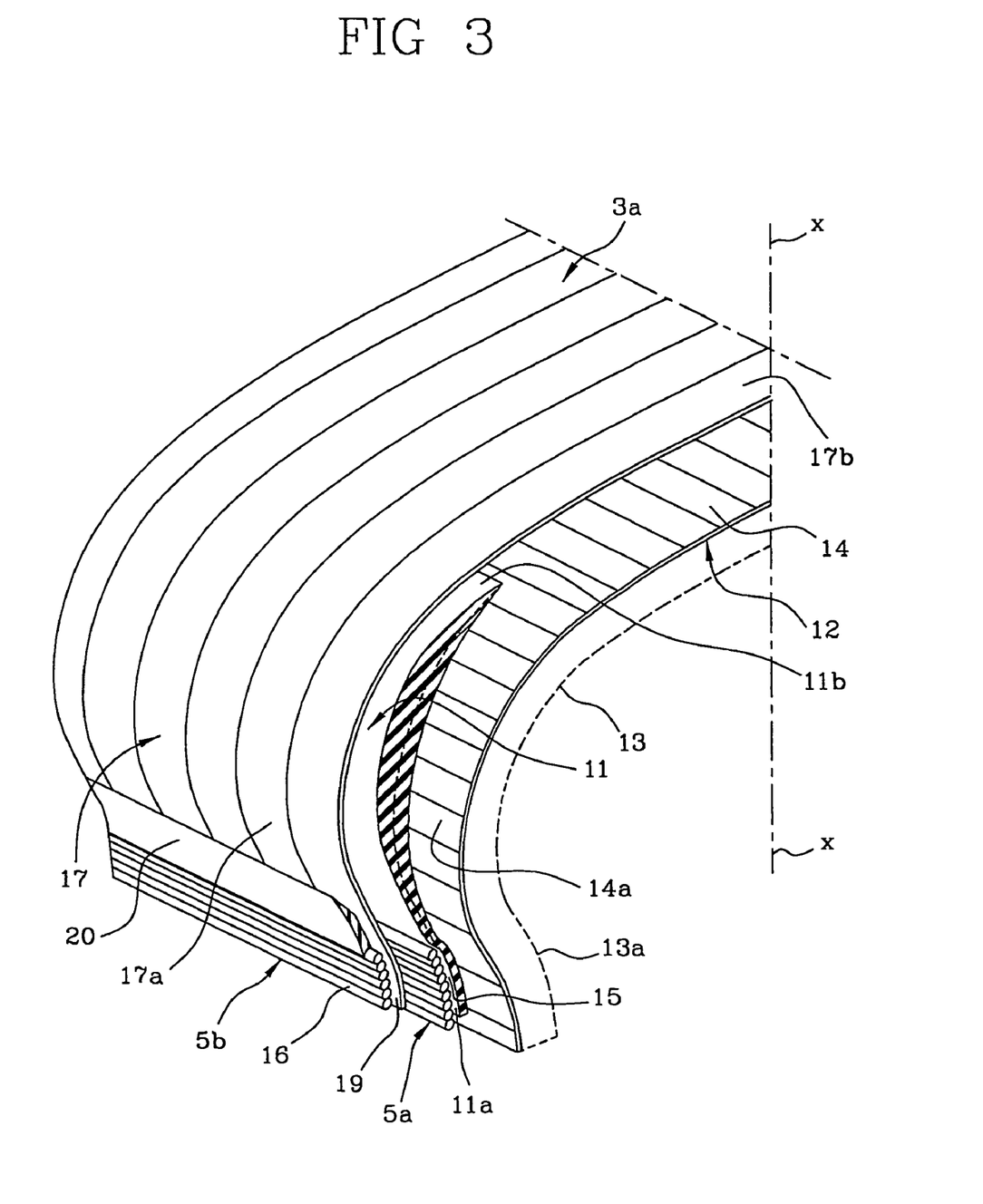
FIG. 3 is a fragmentary perspective view diagrammatically showing the sequence of lying down strip-like sections for the purpose of forming a first carcass ply of the tyre, a second annular anchoring insert and an auxiliary filling element in accordance with the invention.
Figure 4:
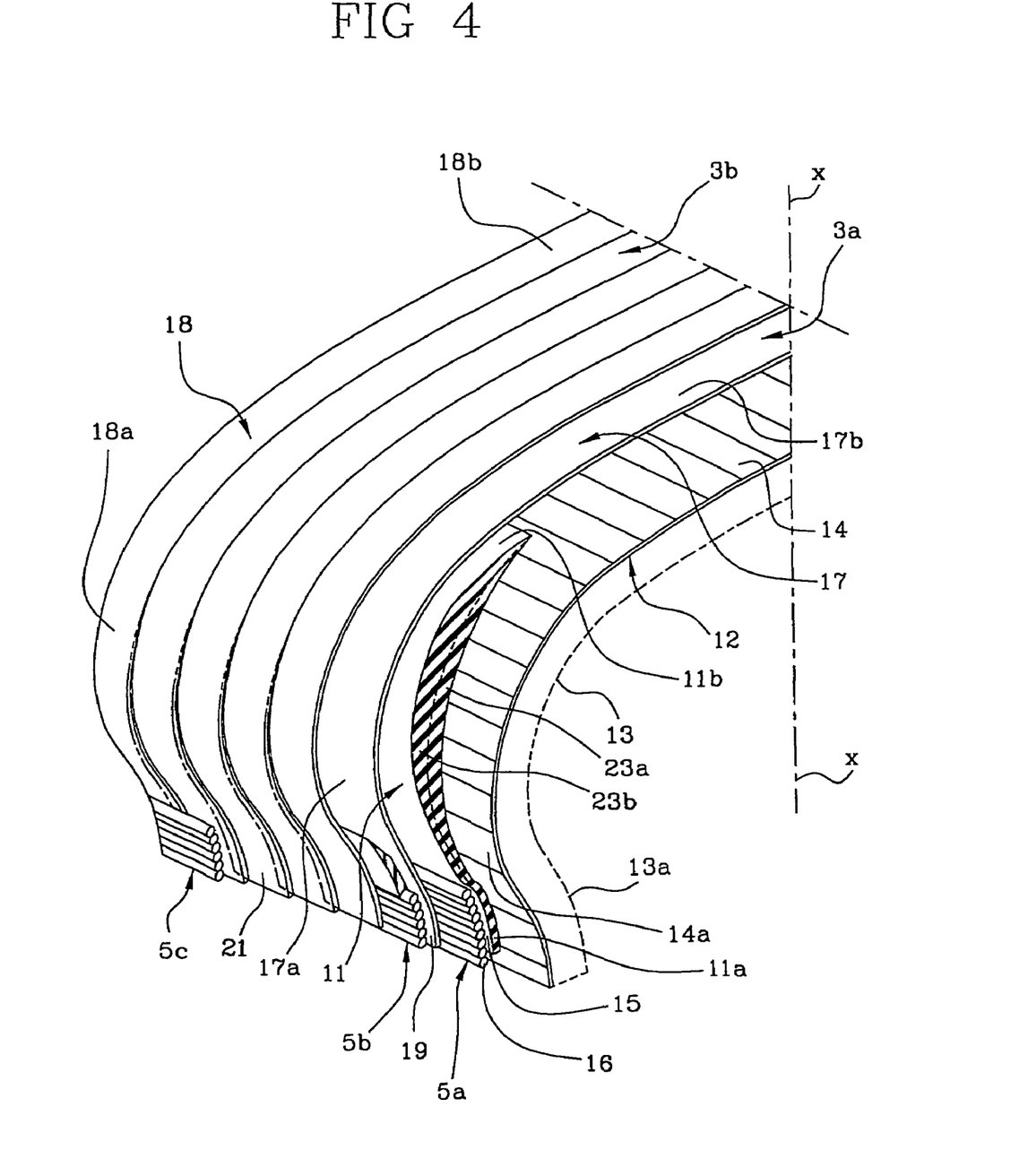
FIG. 4 is a fragmentary perspective view diagrammatically showing the sequence of laying down strip-like sections, for the purpose of forming a second carcass ply of the tyre, and a third annular anchoring insert, in accordance with the invention.
Figure 5:
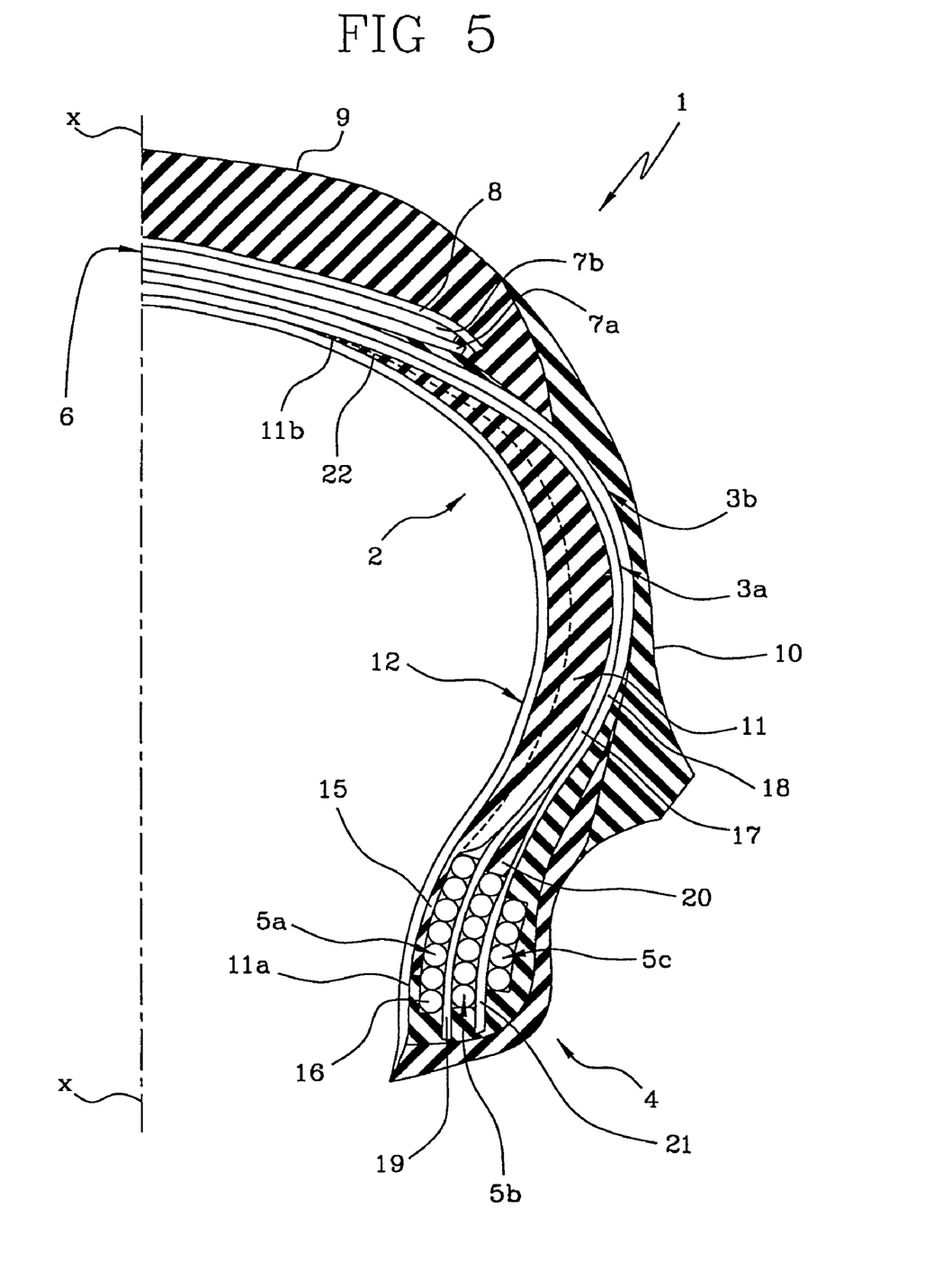
FIG. 5 is a cross half-section of the tyre made in accordance with the preceding figures.

Assembling of the above listed components as well as manufacture of one or more of same takes place with the aid of a toroidal support 13, diagrammatically shown in FIG. 1, the shape of which matches the configuration of the inner walls of the tyre 1 to be made.

The toroidal support 13 may have sizes of a linear value preferably reduced by an amount included between 2% and 5%, as compared with those of the finished tyre and measured just as an indication along the circumferential extension of the support itself at an equatorial plane X—X thereof which is coincident with the equatorial plane of the tyre.

The toroidal support 13, neither described nor shown in detail because it is not of particular importance to the aims of the invention, may for example consist of a collapsible or dismountable drum, or of an inflatable bladder suitably strengthened to take and keep the desired toroidal conformation under inflated conditions.

All that being stated, manufacture of tyre 1 first involves formation of liner 12, if any.

This liner 12 can be advantageously made by circumferentially winding up around the toroidal support 13, at least one ribbon-like band 14 of air-tight elastomer material, produced from an extruder and/or a calender located close to the toroidal support itself. As viewed from FIG. 1, winding of the ribbon-like band 14 substantially takes place with formation of circumferential coils disposed consecutively in side by side relationship so as to follow the cross-section profile of the outer surface of the toroidal support 13.

To the aims of the present description by cross-section profile it is intended the configuration exhibited by the half-section of the toroidal support 13 sectioned in a plane radial to the geometric rotation axis of the toroidal support itself, not shown in the drawings, which is coincident with the geometric rotation axis of tyre 1 and, consequently, of the carcass structure 2 being manufactured.

In accordance with the present invention, the elastic stiffening support or supports 11 (only one of which is shown in the accompanying drawings) are directly formed on the toroidal support 13, each at an axially external position either against the side portions 14a of the ribbon-like band 14 of air-tight elastomer material, if present, or otherwise directly against the side portions 13a of the toroidal support 13. In more detail, as shown in the accompanying drawings, each elastic stiffening insert 11 preferably having a modulus of elasticity included between 30 MPa and 50 MPa has a cross-section profile substantially in the form of a lunette, gradually tapering towards a radially internal apex 11a and a radially external apex 11b thereof, placed just as an indication close to a shoulder region of the tyre.

Advantageously, each of the elastic stiffening inserts 11 can be made by winding at least one continuous strip of elastomer material into coils disposed in axial side by side relationship with, and/or superposed on each other, which strip is forced through an extruder operating close to the toroidal support 13.

The continuous strip may have the final conformation in section of the elastic stiffening insert 11, already on coming out of the respective extruder. However, the continuous strip should preferably have a smaller section than that of the elastic stiffening insert 11, the latter being obtained by applying the strip itself in the form of several coils disposed in side by side and/or superposed relationship, so as to define the insert 11 itself in its final configuration. For further details concerning accomplishment of each elastic stiffening insert 11 please refer to the description of document WO 0136185 and/or document WO 0035666, both in the name of the same Applicant.

After formation of the elastic stiffening inserts 11, at least one first annular anchoring insert 5a being part of the above mentioned annular reinforcing structures 4 is applied onto the elastic stiffening insert 11.

The circumferentially-inextensible annular anchoring insert 5a is substantially in the form of a circular crown concentric with the geometric rotation axis of the toroidal support 13 and has a radial size corresponding to at least twice its axial size. In addition, the annular anchoring insert 5a is placed against a radially internal end portion 15 presented by the elastic stiffening insert 11 at the respective radially internal apex 11a more specifically, the radially internal end portion 15 of the elastic stiffening insert 11 is at least partially disposed in axial side by side relationship against the annular anchoring insert 5a.

In particular, in the embodiment shown in FIGS. 1 to 5, the first annular anchoring insert 5a is placed at an axially external position against the end portion 15 of the elastic stiffening insert 11.

The first annular anchoring insert 5a is preferably made up of at least one thread-like metal element helically wound up around the rotation axis of the tyre to form at least one series of radially superposed coils 16. Coils 16 can be defined by a continuous spiral or by concentric loops formed by respective strip-like elements.

When laying-down of the elastic stiffening insert 11 and the first annular anchoring insert 5a is over, building of tyre 1 goes on with the step of applying the carcass ply or plies 3a, 3b by laying down, as better clarified in the following, strip-like sections which in the course of the present description will be distinguished between inner sections 17 and outer sections 18 respectively, depending on the placement they have within the carcass structure 2. The strip-like sections 17, 18 are advantageously obtained from at least one continuous strip-like element preferably having a width included between 3 mm and 15 mm, essentially made up of longitudinally-disposed thread-like elements of textile or metallic material at least partly incorporated into one or more layers of elastomer material.

Such a continuous strip-like element can be advantageously produced from a calender or extruder installed in the vicinity of the toroidal support 13 on which building of tyre 1 takes place, so that said element may be guided into a deposition apparatus adapted to sequentially cut it to form the strip-like sections 17, 18 concurrently with deposition of same onto the toroidal support itself.

In more detail, execution of the cutting operation on each strip-like section 17, 18 is immediately followed by deposition of said section onto the toroidal support 13 giving the strip-like section a U-shaped configuration around the cross-section profile of the toroidal support itself, in such a manner that in the strip-like section 17, 18 it is possible to identify two side portions 17a, 18a radially extending towards the axis of the toroidal support 13, at positions axially spaced apart from each other and axially external to the elastic stiffening insert 11, and one crown portion 17b, 18b extending at a radially external position between the side portions 17a, 18a.

Further details about the structural features and the manufacturing and positioning modalities concerning the continuous strip-like element and the strip-like sections 17, 18 are described in documents EP 928 680 and EP 928 702, in the name of the same Applicant, contents of which are considered as fully incorporated herein.

The toroidal support 13 can be driven in angular rotation in a stepping movement in synchronism with operation of said deposition apparatus, so that the cutting action of each strip-like section 17, 18 is followed by laying down of said section to a position circumferentially spaced apart from the previously laid down section 17, 18.

In more detail, rotation of the toroidal support 13 takes place according to angular movement steps or pitches to each of which corresponds a circumferential displacement that, depending on requirements, can be substantially equal to the width of each strip-like section 17, 18, or to a multiple of this width. Consequently, the strip-like sections 17, 18 will be laid down according to a circumferential distribution pitch substantially corresponding to their width, or a multiple of this measure. It should be pointed out to the aims of the present description that, if not otherwise stated, the term "circumferential" refers to a circumference-lying in the equatorial plane X—X and close to the outer surface of the toroidal support 13.

In particular, in the embodiments shown, the angular movements of the toroidal support 13 take place in a manner adapted to cause, by a first full revolution of the toroidal support itself around its own axis, laying down of the axially internal sections 17 circumferentially distributed according to a circumferential pitch equal to the width of each of them, so as to form the first inner carcass ply 3a.

In addition, the axially internal strip-like sections are of such a length that the end flaps 19 of the side portions 17a of such sections are axially superposed on the first annular anchoring insert 5a.

If required, laying down of the axially internal strip-like sections 17 may take place in an inclined orientation with respect to the circumferential extension direction of the toroidal support, at an angle included between 15° and 35° for example.

Adjustment of the deposition angle of the strip-like sections can be for example obtained by suitably orienting the geometric rotation axis of the toroidal support relative to the deposition apparatus.

Subsequently to laying down of the axially internal sections 17, formation of the carcass structure 2 goes on by laying down of at least one second annular anchoring insert 5b against the end flaps 19 of the axially internal sections 17 themselves.

The second annular anchoring insert 5b is therefore disposed in axial side by side relationship with the first annular anchoring insert 5a at an axially external position relative to the first carcass ply 3a.

The end flaps 19 of the axially internal sections 17 therefore are axially interposed between the first annular anchoring insert 5a and the second anchoring annular insert 5b.

In accordance with a preferential solution, the second annular anchoring insert 5b is directly built against the end flaps 19 of the strip-like sections 17, thereby forming coils 16 by winding up of the strip-like element possibly with the aid of rollers or other convenient means acting against the action of the surface of the toroidal support 13.

An auxiliary filling body 20 of elastomer material may be combined with the second annular anchoring insert 5b, said filling body having a modulus of elasticity preferably greater than that of the stiffening insert 11, preferably included between 75 MPA and 95 MPA, and radially tapering from the second annular insert 5b away from the geometric rotation axis of the toroidal support 13.

The auxiliary filling body 20 can be in turn directly applied against the first carcass ply 3a in the same manner as pointed out with reference to formation of the elastic stiffening insert 11.

After application of the auxiliary filling body 20 of the annular reinforcing structures 4, formation of the carcass structure 2 goes on by laying down of the axially external sections 18 applied to the toroidal support 13 in the same manner as specified for the axially internal sections 17, so as to form a second carcass ply 3b.

In a convenient embodiment, the axially external strip-like sections 18 are laid down in a crossed orientation with the inner sections 17, preferably at an angle symmetrically opposite to that shown by said inner sections, with reference to the circumferential-extension direction of the carcass structure 2.

Laying down of the axially external strip-like sections 18 preferably takes place with a circumferential pitch substantially corresponding to the width of said sections so as to complete formation of the second carcass ply 3b following execution of a single complete revolution by the toroidal support 13 around its rotation axis.

According to an alternative embodiment not shown, the inner strip-like sections 17 are laid down, by a first complete revolution of the toroidal support 13 itself around its axis, with a pitch corresponding to a multiple of their width; the outer sections 18 are distributed with a circumferential pitch corresponding to a multiple of their width and each have the respective crown portion 18b interposed in a circumferential side by side relationship between the crown portions 17b of two axially internal sections 17, to define a single carcass ply 3a, 3b therewith.

The respective side portions 17a, 18a are axially offset from each other to house the second annular anchoring insert 5b in the gaps between the side portions of the inner 17a and outer 18a sections.

Therefore, in both embodiments, when laying down is completed, the second annular anchoring insert 5b is interposed between the end flaps 19 of the axially internal sections 17 and the end flaps 21 of the axially external sections 18.

The sections of the first and second series 17, 18 are mutually joined along the whole extension of the cross-section profile of the toroidal support itself except at the end flaps 19, 21 close to the beads.

In accordance with a preferential embodiment of the invention, after carrying out deposition of the axially external strip-like sections 18, formation of the annular reinforcing structures 4 is completed, by application of at least one third annular anchoring insert 5c disposed in external side by side relationship with the end flaps 21 of the side portions 18a of the axially external strip-like sections 18.

Preferably, each third annular insert 5c is essentially made up of a wire or thread wound up into coils 16 disposed crownwise, in the same manner as described with reference to formation of the first annular insert 5a and the second annular insert 5b.

Following the above operation, each of the end flaps 21 of the axially external sections 18 is advantageously enclosed between the second 5b and third 5c annular anchoring inserts of the respective annular reinforcing structure 4.

In tyres of the radial type, usually applied to the carcass structure 2 is the belt structure 6.

Such a belt structure 6 can be made in any convenient manner envisaged by a person skilled in the art and, in the embodiment shown, it essentially comprises a first and a second belt strips 7a, 7b consisting of cords with a respectively crossed orientation. Superposed on the belt strips 7a, 7b is an auxiliary belt strip 8 which is for example obtained by arranging at least one continuous cord wound into substantially circumferential coils in axial side by side relationship around the belt strips themselves.

Advantageously, the belt structure 6 is at least partly superposed on a radially external portion 22 of the elastic stiffening insert 11 at its radially external apex 11b, to establish the continuity between the two elements.

Then the tread band 9 is applied to the belt structure 6 while sidewalls 10 are applied to the side portions of the carcass structure 2, said sidewalls too being obtained in any manner convenient for a person skilled in the art.

Embodiments of a belt structure, sidewalls and a tread band to be advantageously adopted for the complete building of tyre 1 on the toroidal support 13 are described in document EP 919 406, in the name of the same Applicant.

Tyre 1 thus built now lends itself to be submitted, possibly after removal of support 13, to a vulcanization step that can be conducted in any known and conventional manner.

Figure 6:
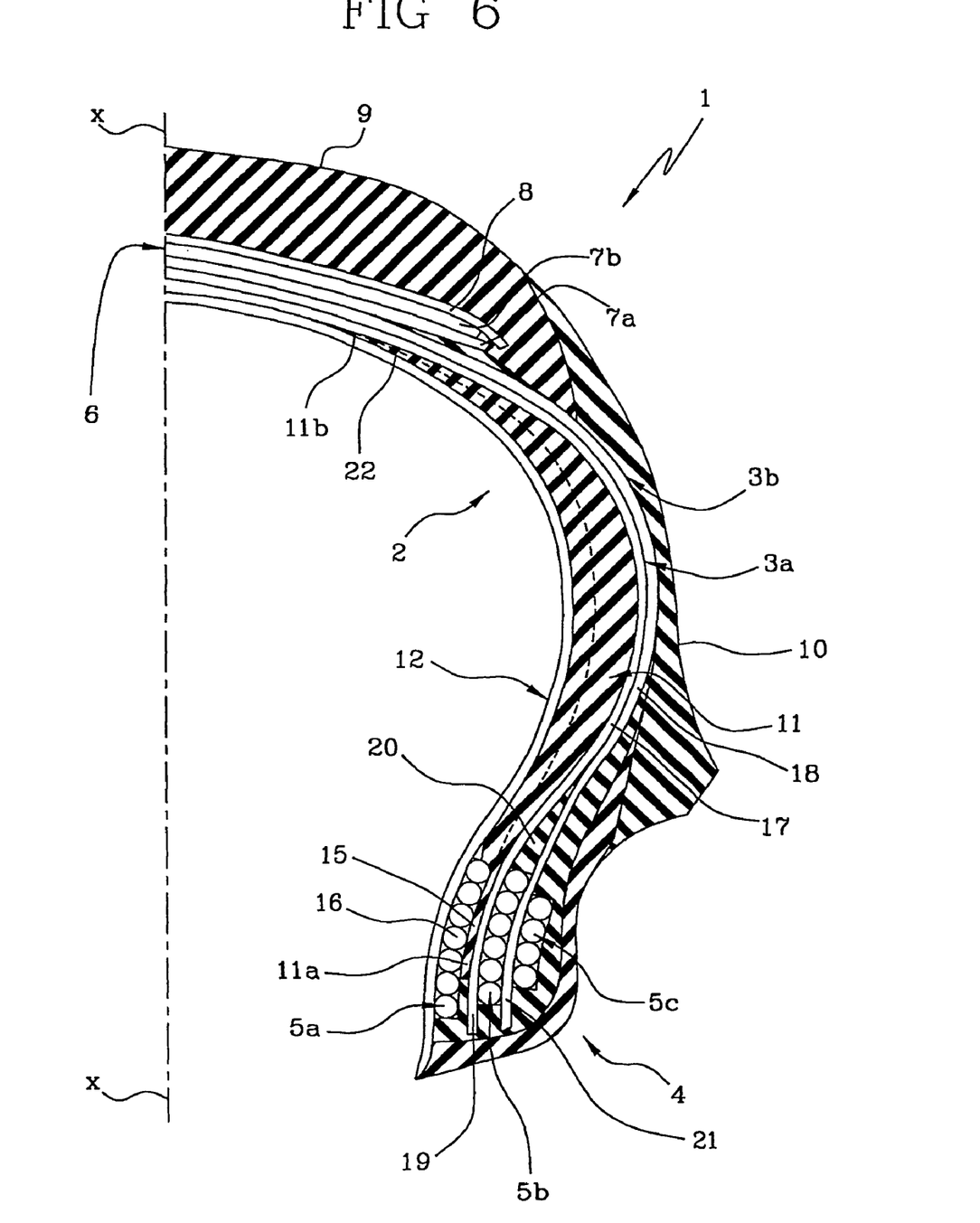
FIG. 6 shows a cross half-section of a second embodiment of a tyre in accordance with the present invention.

An alternative example of a tyre with a self-supporting carcass structure 2 to be obtained in accordance with the present invention is shown in FIG. 6.

According to the embodiment shown in FIG. 6, laying down of the first annular anchoring insert 5a is carried out before laying down of the elastic stiffening insert 11 directly against the side portions 13a of the toroidal support 13, so that the first annular anchoring insert 5a may keep an axially internal position against the end portion 15 of the elastic stiffening insert 11.

Accomplishment of each component takes place substantially in the same manner as previously described with reference to FIGS. 1 to 5 or in a similar way.

In an embodiment not shown, the elastic stiffening insert 11 may extend on both sides of the first annular anchoring insert 5a to ensure the maximum contact surface between the two elements. The radially internal portion 15 of said elastic stiffening insert 11 therefore has a first end length placed at an axially internal position relative to the first annular anchoring insert 5a and a second end length placed at an axially external position relative to the first annular anchoring insert 5a. The first annular anchoring insert 5a is therefore axially interposed between two end lengths belonging to the end portion 15 of the elastic reinforcing insert 11.

It should be noticed that each elastic stiffening insert 11, disposed internally of the carcass plies 3a, 3b and in contact relationship with the first inner ply 3a along its axially external surface, can be made up of a plurality of axially-disposed contiguous layers formed with blends of different moduli of elasticity.

For example, as shown in the accompanying figures, the elastic stiffening insert 11 can be formed with two axially superposed layers 23a, 23b without interruption. The second axially-outermost layer 23b mainly submitted to tensile stresses, is in direct contact with the carcass plies 3a, 3b and preferably has a modulus of elasticity greater than the modulus of elasticity of the first innermost-layer 23a mainly submitted to compressive stresses.

The containment degree of the deformations of the elastic stiffening inserts 11 can therefore be modulated by modifying the construction scheme of the elastic stiffening inserts 11, depending on requirements, above all in connection with their position relative to the annular anchoring inserts 5a, 5b, 5c, so as to give tyre 1 the desired self-support qualities without increasing the torsional rigidity and weight of same too much, which values are particularly important for ride comfort.

The direct connection between the stiffening insert and annular anchoring insert proposed by the invention ensures a greater structural continuity between the two elements and represents a net improvement over known solutions, in which the lunette is maintained separated from the bead ring due to interposition of at least the carcass plies turned up around said ring.

In fact, the anchoring scheme in accordance with the present invention under ride conditions with a deflated tyre, enables the tractive load due to deformation of the area immediately overlying the annular anchoring insert to be transferred to the inner ply with greater efficiency.

In addition, the anchoring scheme in accordance with the present invention enables a sufficient radial stiffness with a deflated tyre to be obtained even by adopting a single stiffening insert applied to the inside of the carcass plies, thus avoiding the complexity, heaviness and other functional problems typical of structures provided with several inserts.

Finally, the invention enables accomplishment of a self-supporting tyre the carcass structure of which lends itself to be directly obtained on a toroidal support on which the whole tyre can be advantageously built.

In this way, all problems connected with manufacture, storage and management of semifinished products which are common to manufacturing processes of a traditional conception are eliminated.

What is claimed is:

1. A self-supporting tyre for a vehicle wheel, comprising:
   a carcass structure;
   a belt structure;
   a tread band;
   a pair of sidewalls; and
   at least one elastic stiffening insert;
   wherein the carcass structure comprises at least one carcass ply,
   wherein the at least one carcass ply is provided with end flaps engaged with respective annular reinforcing structures,
   wherein the annular reinforcing structures are disposed in coaxial relationship with a geometric rotation axis of the tyre at positions axially spaced apart from each other,
   wherein each annular reinforcing structure comprises at least one first circumferentially inextensible annular anchoring insert,
   wherein the belt structure is applied to the carcass structure at a radially external position of the carcass structure,
   wherein the tread band is applied to the belt structure at a radially external position of the belt structure,
   wherein the sidewalls are applied to the carcass structure at axially opposite positions,
   wherein the at least one elastic stiffening insert is incorporated into the carcass structure, at least at one of the sidewalls, and
   wherein the at least one elastic stiffening insert comprises a radially internal end portion at least partly disposed in axial side-by-side relationship against the at least one first annular anchoring insert.

2. The tyre of claim 1, wherein the at least one first annular anchoring insert is disposed at an axially external position against an end portion of the at least one elastic stiffening insert.

3. The tyre of claim 1, wherein the at least one first annular anchoring insert is disposed at an axially internal position against an end portion of the at least one elastic stiffening insert.

4. The tyre of claim 1, wherein the radially internal end portion of the at least one elastic stiffening insert comprises a first end length disposed in an axially internal position relative to the at least one first annular anchoring insert, and
   wherein the radially internal end portion of the at least one elastic stiffening insert comprises a second end length disposed in an axially external position relative to the at least one first annular anchoring insert.

5. The tyre of claim 1, wherein the at least one elastic stiffening insert is disposed in an axially internal position relative to the at least one carcass ply, and
   wherein the at least one elastic stiffening insert is disposed in contact relationship with the at least one carcass ply.

6. The tyre of claim 1, wherein the at least one elastic stiffening insert comprises at least one first axially internal layer, and
   wherein the at least one elastic stiffening insert comprises a second axially external layer superposed on the at least one first axially internal layer without interruption.

7. The tyre of claim 6, wherein the at least one first axially internal layer has a smaller modulus of elasticity than the second axially external layer.

8. The tyre of claim 1, wherein the at least one elastic stiffening insert comprises a radially external portion overlaid by the belt structure.

9. The tyre of claim 1, wherein the at least one first annular anchoring insert comprises at least one thread element helically wound up around the geometric rotation axis of the tyre to form at least one series of radially superposed coils, and
   wherein the at least one first annular anchoring insert comprises a radial size corresponding to at least twice an axial size of the at least one first annular anchoring insert.

10. The tyre of claim 1, further comprising:
    at least one second annular anchoring insert;
    wherein the at least one second annular anchoring insert is disposed in axial side-by-side relationship with the at least one first annular anchoring insert,
    wherein the at least one second annular anchoring insert is disposed axially external to the at least one carcass ply, and
    wherein the at least one carcass ply is axially interposed between the at least one first annular anchoring insert and the at least one second annular anchoring insert.

11. The tyre of claim 10, further comprising:
    an auxiliary filling body;
    wherein the auxiliary filling body radially tapers from the at least one second annular anchoring insert away from the geometric rotation axis of the tyre.

12. The tyre of claim 11, wherein the auxiliary filling body has a modulus of elasticity greater than a modulus of elasticity of the at least one elastic stiffening insert.

13. The tyre of claim 1, wherein the at least one carcass ply comprises:
    strip sections circumferentially distributed around the geometric rotation axis of the tyre;
    wherein each strip section extends in a U-shaped configuration around a cross-section profile of the carcass structure to define two side portions and a crown portion, wherein the side portions are mutually spaced apart in an axial direction, and wherein the crown portion extends at a radially external position between the side portions.

14. The tyre of claim 13, wherein the strip sections comprise:

axially internal strip sections; and axially external strip sections;

wherein the side portions of the axially internal strip sections are axially offset with respect to the side portions of the axially external strip sections, to house at least one second annular anchoring insert in gaps existing between the side portions.

15. The tyre of claim 14, wherein the axially internal strip sections are distributed with a circumferential pitch corresponding to a width of the axially internal strip sections, to define a first carcass ply, wherein the axially external strip sections are distributed with a circumferential pitch corresponding to a width of the axially external strip sections, to define a second carcass ply, and wherein the second carcass ply is radially superposed on the first carcass ply close to the crown portions.

16. The tyre of claim 14, wherein the axially internal strip sections are distributed with a circumferential pitch corresponding to a multiple of a width of the axially internal strip sections, wherein the axially external strip sections are distributed with a circumferential pitch corresponding to a multiple of a width of the axially external strip sections, and wherein crown portions of the axially external strip sections are interposed in circumferential side-by-side relationship between crown portions of two axially internal strip sections, to define a single carcass ply.

17. The tyre of claim 14, further comprising:

at least one third annular anchoring insert;

wherein the at least one third annular anchoring insert is disposed externally in side-by-side relationship against end flaps of the side portions of the axially external strip sections.

18. A method of making a self-supporting tyre for a vehicle wheel, comprising:

preparing a carcass structure;

applying a belt structure to the carcass structure at a radially external position of the carcass structure;

applying a tread band to the belt structure at a radially external position of the belt structure;

applying a pair of sidewalls to the carcass structure at axially opposite positions; and incorporating at least one elastic stiffening insert into the carcass structure, at least at one of the sidewalls;

wherein the carcass structure comprises at least one carcass ply, wherein the at least one carcass ply is provided with end flaps engaged with respective annular reinforcing structures, wherein the annular reinforcing structures are disposed in coaxial relationship with a geometric rotation axis of the tyre at positions axially spaced apart from each other, wherein each annular reinforcing structure comprises at least one first circumferentially inextensible annular anchoring insert, and wherein the at least one elastic stiffening insert comprises a radially internal end portion at least partly disposed in axial side-by-side relationship against the at least one first annular anchoring insert.

19. The method of claim 18, further comprising:

applying the at least one elastic stiffening insert onto a toroidal support, or onto a liner on the toroidal support, at an axially external position against side portions of the toroidal support, or of the liner on the toroidal support; and applying the at least one first annular anchoring insert to the at least one elastic stiffening insert at the radially internal end portion of the at least one elastic stiffening insert.

20. The method of claim 18, further comprising:

applying the at least one first annular anchoring insert onto a toroidal support, or onto a liner on the toroidal support, at an axially external position against side portions of the toroidal support, or of the liner on the toroidal support; and applying the at least one elastic stiffening insert to the at least one first annular anchoring insert at the radially internal end portion of the at least one elastic stiffening insert.

21. The method of claim 18, wherein the at least one elastic stiffening insert is obtained by winding at least one continuous strip of elastomer material into coils disposed in axial side-by-side relationship, radial superposition relationship, or axial side-by-side and radial superposition relationship.

22. The method of claim 18, wherein preparation of the at least one carcass ply compnses:

laying down circumferentially distributed strip sections on a toroidal support, or on a liner on the toroidal support;

wherein each strip section extends in a U-shaped configuration around a cross-section profile of the toroidal support to define two side portions and a crown portion, wherein the side portions are mutually spaced apart in an axial direction, and wherein the crown portion extends at a radially external position between the side portions.

23. The method of claim 22, wherein the strip sections are laid down on the at least one first annular anchoring insert previously deposited on the toroidal support, or on the liner on the toroidal support, and wherein the strip sections are laid down on the at least one elastic stiffening insert previously deposited on the toroidal support, or on the liner on the toroidal support.

24. The method of claim 22, further comprising:

laying down axially internal strip sections;

applying at least one second annular anchoring insert against end flaps of the axially internal strip sections; and laying down axially external strip sections.

25. The method of claim 24, wherein the axially internal strip sections are laid down with a circumferential pitch corresponding to a width of the axially internal strip sections, to define a first carcass ply, wherein the axially external strip sections are laid down with a circumferential pitch corresponding to a width of the axially external strip sections, to define a second carcass ply, and wherein the second carcass ply is radially superposed on the first carcass ply close to the crown portions.

26. The method of claim 24, wherein the axially internal strip sections are laid down with a circumferential pitch corresponding to a multiple of a width of the axially internal strip sections,
- wherein the axially external strip sections are laid down with a circumferential pitch corresponding to a multiple of a width of the axially external strip sections, and
- wherein crown portions of the axially external strip sections are interposed in circumferential side-by-side relationship between crown portions of two axially internal strip sections, to define a single carcass ply.

27. The method of claim 24, further comprising:

applying an auxiliary filling body to the at least one second annular anchoring insert;

wherein the auxiliary filling body radially tapers from the at least one second annular anchoring insert away from the geometric rotation axis of the tyre, and wherein the auxiliary filling body is applied before laying down the axially external strip sections.

28. The method of claim 24, further comprising:

applying at least one third annular anchoring insert against end flaps of the axially external strip sections;

wherein the at least one third annular anchoring insert is applied after laying down the axially external strip sections.

* * * * *